United States Patent [19]

Munro

[11] Patent Number: 5,186,308
[45] Date of Patent: Feb. 16, 1993

[54] ELECTRICAL SYSTEM FOR INDUSTRIAL CONVEYORS

[76] Inventor: Mark S. Munro, 4110 Robin Hood La., Traverse City, Mich. 49684

[21] Appl. No.: 762,406

[22] Filed: Sep. 19, 1991

[51] Int. Cl.⁵ .............................................. B65G 43/08
[52] U.S. Cl. ..................................... 198/572; 198/575; 198/576
[58] Field of Search ................ 198/571, 572, 575, 576

[56] References Cited

U.S. PATENT DOCUMENTS

| | | |
|---|---|---|
| 3,299,323 | 1/1967 | Dudley . |
| 3,512,662 | 5/1970 | Strydom ........................ 198/572 X |
| 4,138,010 | 2/1979 | Pidgeon et al. . |
| 4,227,607 | 10/1980 | Malavenda ..................... 198/575 X |
| 4,239,434 | 12/1980 | Gannon . |
| 4,372,439 | 2/1983 | Dempsey . |
| 4,445,880 | 5/1984 | Powers, Jr. . |
| 4,512,747 | 4/1985 | Hitchens et al. . |
| 4,604,704 | 8/1986 | Eaves et al. . |
| 4,618,932 | 10/1986 | Sauer ........................... 198/575 X |
| 4,718,538 | 1/1988 | Löw et al. ..................... 198/572 X |
| 4,766,547 | 8/1988 | Modery et al. . |
| 4,768,766 | 9/1988 | Berger et al. . |
| 4,837,704 | 6/1989 | Lengefeld . |
| 4,870,590 | 9/1989 | Kawata et al. . |
| 4,870,592 | 9/1989 | Lampi et al. . |
| 5,058,727 | 10/1991 | Jahns et al. .................... 198/575 X |

FOREIGN PATENT DOCUMENTS

| | | | |
|---|---|---|---|
| 0000359 | 1/1979 | Japan .................................. | 198/572 |
| 0044489 | 3/1980 | Japan .................................. | 198/572 |
| 0119647 | 9/1980 | Japan .................................. | 198/572 |
| 0075311 | 6/1981 | Japan .................................. | 198/572 |

Primary Examiner—D. Glenn Dayoan
Attorney, Agent, or Firm—Reising, Ethington, Barnard, Perry & Milton

[57] ABSTRACT

An electrical control system is disclosed for industrial conveyor systems which includes plural individual conveyors. The system includes a single main controller and a sub-controller for each individual conveyor in the system. Each sub-controller is located adjacent its own conveyor and is wired directly to the input and output devices of its own conveyor, thus requiring only localized field wiring for the electrical system. The control logic for each individual conveyor and the overall conveyor system is provided by a programmable controller in the main controller coupled through a communication line to the sub-controllers. The electrical control system is provided with a diagnostic system with the diagnostic circuitry located in each of the sub-controllers. Each of the sub-controllers is provided as a standardized module with a printed circuit board containing all of the interconnections required by the sub-controller except the local wiring connections to the conveyor itself.

10 Claims, 6 Drawing Sheets

ELECTRICAL SYSTEM FOR INDUSTRIAL CONVEYORS

FIELD OF THE INVENTION

This invention relates to industrial conveyors such as those used in manufacturing operations. More particularly, it relates to the electrical system for energizing and controlling a conveyor system.

BACKGROUND OF THE INVENTION

In the manufacturing industries, especially in automobile manufacturing, the assembly and processing operations are currently performed with a high degree of automation including many types of robotic devices. Typically, a component part of the product being manufactured or a sub-assembly thereof is moved by a conveyor from station-to-station for a particular processing operation at each sequential station. In many factory installations, it is necessary to have a conveyor system which comprises two or more individual conveyors which must operate in timed relationship with regard to delivery or transfer of a workpiece. In such an installation, the two or more conveyors may have the single intersection or connection of their pathways, for transfer or the like, and one or more of the conveyors may extend over a very long distance within the factory. In automobile manufacturing, for example, the body shell of a car is moved by a main conveyor along a processing or assembly line which has a section provided with body painting stations. The body shell may be moved by the main conveyor through the painting section and continue to other sections of the conveyor and subsequent work stations along the same main conveyor. However, an inspection station prior to the painting section may detect a defect in the body shell which should be corrected before painting and a transfer station is provided to transfer the defective body shell to a secondary or feeder conveyor which will carry the body shell to a repair facility. Also certain of the body shells on the main conveyor may be programmed for two-tone painting and at a station following paint application on the main conveyor it is transferred to a separate feeder conveyor which carries it through other painting stations. A conveyor system of the type described requires a control system for controlling the movements of the carrier and other components of an individual conveyor in the system. For example, the movement of one conveyor must be started in timed relation with the starting or stopping of another conveyor in the same system or an actuator on one of the conveyors must be operated in timed relation with the movement of the other conveyor. Such coordinated or synchronized control and movement of individual conveyors is provided by the electrical control system.

It has been the common practice in the manufacturing industry to provide control for a conveyor system having plural individual conveyors by a master control system at a centralized single electrical control panel.

A typical prior art control system is costly and time consuming to install in the factory, especially for a conveyor system extending over a large distance. Such systems may include several individual conveyors and, in the prior art, utilize a centralized control panel which serves as the receiving and distribution point for electrical power and for control signals for the entire conveyor system. Typically, the control panel is supplied by utility company power lines with 3-phase, 480 volts through a main disconnect switch and power at 480 or 120 volts is applied through control devices in the panel to the conveyor drive motors and actuators of various types in the conveyor system. A programmable controller in the panel provides programmed logic for system control. It responds to a large number of input signals from signal input devices in the conveyor system and produces, according to the user program of the controller, a large number of signals for controlling various output devices. Input devices, such as switching contacts and photo sensors, mostly are two state devices and the output devices include motors, electrically actuated pneumatic valves, positioning solenoids and electrically energized clutches and lamps most of which are two state devices.

In the fabrication of conveyor systems of the type described above, it is the usual practice of the conveyor manufacturer to construct the control panel in its own facility for subsequent installation at the factory in which the conveyor is to be used. Likewise, the conveyor structure is built in sections or sub-sections in the conveyor manufacturers plant and then put together in the factory. The control panel generally comprises a floor mounted cabinet with a rear wall, called the back panel, on which the electrical components of the system are mounted. Because of the large number and size of the components, the cabinet and back panel may be seven feet in height and twenty or more feet in length and, occupies a significant amount of factory floor space. In construction, the back panel, usually made up of several joined sections, is laid out as a horizontal work table and the components are mounted thereon in specified locations with wiring troughs or channels built onto the panel for running wires between components. The components include power line terminals, a main switch, overvoltage/overcurrent protection devices, motor starters, relays, indicator lamps, and a programmable controller. The panel is also provided with input field wiring terminals and output field wiring terminals. Each input terminal is connected by panel wiring to one of the components on the panel and each of the output terminals is connected by panel wiring to one of the components on the panel. This arrangement permits the internal wiring of the control panel to be completed by the conveyor manufacturer before the control panel is delivered to the factory for installation. The field wiring terminals facilitate the on-site connection to the panel of the input devices and output devices, which are mounted on the conveyor. The field wiring of a conveyor system for a system of moderate size and complexity will require the connection of several hundred separate wires and, because each wire originates at the control panel and extends to a particular point on the conveyor system, the individual wires will range in length up to several thousand feet. The field wiring, because of the large number of wires and the length of wires, contributes significantly to the cost of a conveyor system.

Because of the large number of wires and the length and paths of the wire runs, trouble shooting to find faults in the system after the field wiring is installed is especially difficult and time consuming. The use of diagnostic systems has not been practical in the prior art conveyor control systems, partly because it would be necessary to increase the number of manually applied interconnections by several fold, thus increasing the complexity and cost of installation with likelihood of decreased reliability because of the increase chance of wiring errors.

A general object of this invention is to provide an improved electrical control system for an industrial conveyor system which overcomes certain disadvantages of the prior art.

SUMMARY OF THE INVENTION

In accordance with this invention, the electrical control system for an industrial conveyor system is provided which is greatly simplified and reduced in cost. This is accomplished by providing a single main controller and a plurality of subsidiary controllers, i.e. sub-controllers, there being a sub-controller for each different conveyor in the system. Each sub-controller is located adjacent its own conveyor and is wired directly to the input and output devices of its own conveyor. The control logic for each individual conveyor and the operational relationship among them is provided by a programmable controller in the main controller and coupled through a communication link to the sub-controllers.

Further, in accordance with this invention, the electrical control system for an industrial conveyor is provided with a diagnostic system. This is accomplished by a control system comprising a main controller and plural sub-controllers as aforesaid with diagnostic circuitry in each of the sub-controllers using the diagnostic program of the programmable controller in the main controller.

Further, in accordance with this invention, a sub-controller is provided in the form of a standardized module which may be adapted to a particular conveyor. This is accomplished by providing a sub-controller which includes input and output cards and a communication card for communication with a programmable controller, a printed circuit board which contains the interconnections between the output card and the output devices, and includes relays and motor starters. Further, the sub-controller may be mounted on or immediately adjacent the conveyor controlled by it with local wiring only between it and the input and output devices on the conveyor and with remote wiring only to the power bus and the programmable controller.

Further, in accordance with the invention, a conveyor system is provided with a main controller and a sub-controller for each of several conveyors in the system. The main controller includes a programmable controller with a communication card and a main disconnect switch for electric power lines to the conveyor system. Each of said sub-controllers includes power line input terminals, a signal output card, a signal input card and a communications card which is coupled with the communications card of the programmable controller. A conductive wire is connected between each of the output card terminals and an output device on the conveyor and a wire is connected between each input device on the conveyor and the input card terminal. The programmable controller is operable under control of an applications program to produce output signals on the output terminals of the addressed output card in a sub-controller to control the operation of the conveyor.

A complete understanding of this invention may be obtained from the detailed description that follows taken with the accompanying drawings.

A PRIOR ART CONTROL SYSTEM

Figure 1:
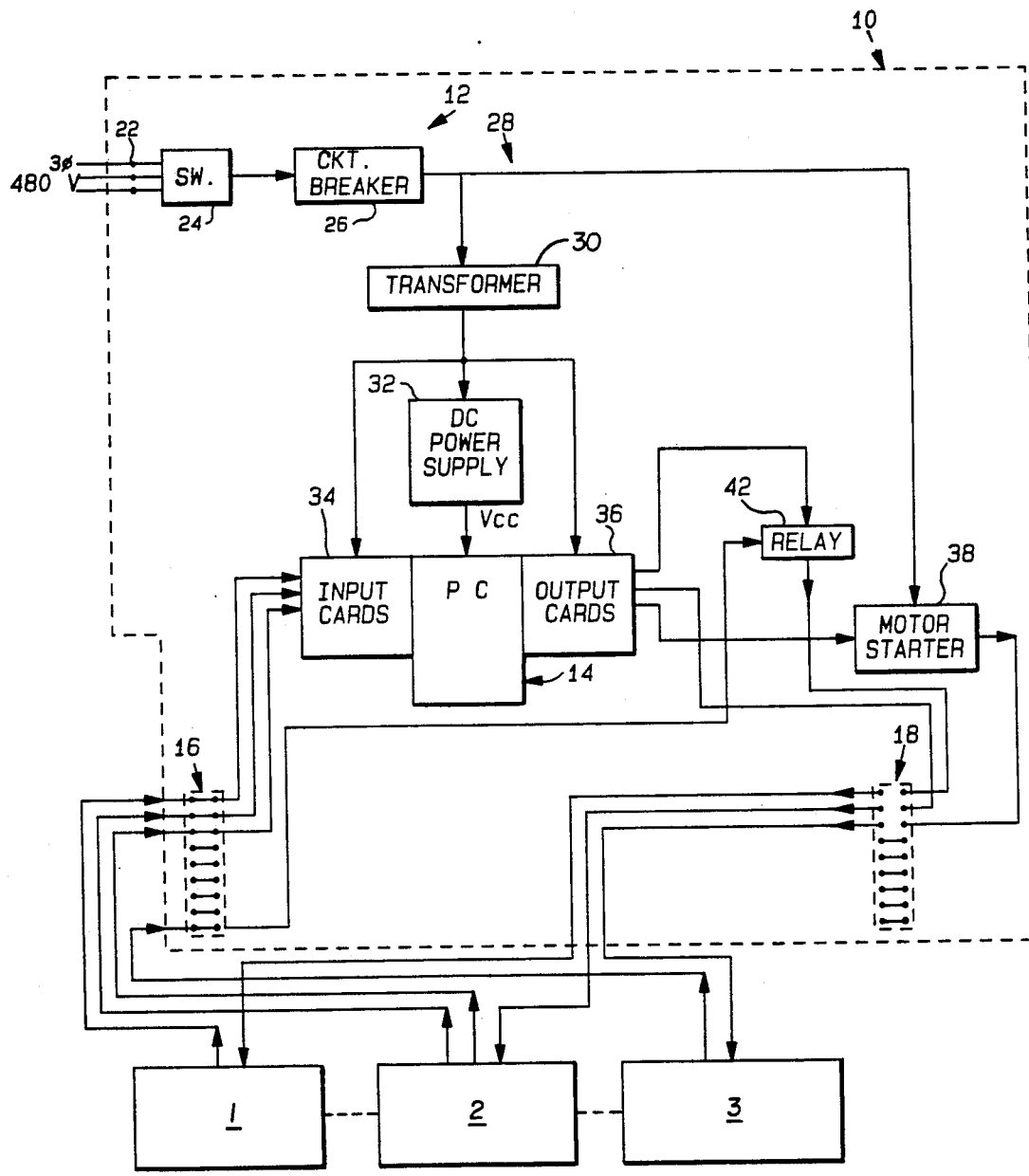
FIG. 1 is a block diagram of a prior art electrical control system for industrial conveyors.

Before proceeding with the description of the invention, a prior art electrical control system for a conveyor system will be described with reference to FIG. 1. The prior art controller is depicted in block diagram and is contained within a control panel represented by the dashed line rectangle 10. The controller controls a conveyor system including three individual conveyors 1, 2 and 3 which coact with each other in timed relation. It comprises, in general, an alternating current power supply circuit 12 for supplying AC voltage to the components in the panel and to the conveyor through other panel components. It also comprises a programmable controller 14 (hereinafter referred to as a 'PC') which monitors the state of the input devices in the conveyor system which are wired to the PC and processes this information in accordance with the control program in the processor and produces signals which control the output devices in the conveyor system. The control panel also includes a set of input field wiring terminals 16 and a set of output field wiring terminals 18.

The AC power supply circuit 12 includes input terminals 22 which are connected with 480 volt, 3-phase, 60 Hz power lines from the power supply utility. The terminals 22 are connected through a main disconnect switch 24 to a circuit breaker 26 for overvoltage and overcurrent protection which in turn is connected with the power bus 28. For the sake of simplicity, all of the power lines and signal conductors are represented by single lines regardless of the actual number of conductors and an arrow head indicates the direction of power flow or the direction of signal flow, as the case may be. The PC 14 is energized by a DC power supply 32 which is connected with the power bus 28 through a stepdown transformer 30 which supplies 120 volts AC to the control panel. The power supply 32 provides a regulated DC voltage to the PC 14. The PC is provided with a set of input modules or cards 34 with multiple terminals for receiving input signals from the input devices of the conveyor. The controller is also provided with a set of output cards 36 with multiple terminals individually connected for providing output signals to output devices of the conveyor. The input field wiring terminals 16 are connected with respective terminals of the input cards 34. Similarly, the output field wiring terminals 18 are connected respectively with the terminals of the output cards 36. The control panel 10 is provided with a number of motor starters 38 and a number of relays 42; for simplicity, only one of each is shown. There is a motor starter for each conveyor drive motor in a conveyor system. As indicated, the motor starter 38 supplies voltage from the power bus 28 to a set of terminals in the output field wiring terminals 18 for connection to the respective motor. The motor starter 38 is connected with a terminal of the output card 36 for control by the programmable controller. There may be a large number of relays on the control panel depending upon the requirements of the conveyor system. The relay 42, for example, is in a hardwired circuit which can interrupt the power to an output device which is turned on by the PC and may be used as an emergency shut-off circuit controlled by a manual switch of the conveyor system. The control input of the relay 42 is connected with an input terminal 16 and the output of the relay 42 is connected with an output terminal 18 which, in turn, is connected with an output device (not shown) of the conveyor system.

The prior art control panel 10, as illustrated in FIG. 1, is utilized with a conveyor system comprising three conveyors 1, 2 and 3. The factory installation of the controller with the conveyor system requires field wiring, i.e. on-site electrical connection, between the control panel and the conveyor sections. This requires individual conductors to be connected between the terminals of the input field wiring terminals 16 and input devices such as switches, photo cells and other sensors which are located or mounted on the conveyor. Typically, the field wiring conductors for the input devices carry 120 volts and low current and must extend over a long distance, sometimes hundreds of feet to the particular conveyor. Similarly, the output devices in the system must be field wired to the output field wiring terminals 18. The output devices include the conveyor drive motors, solenoids, electric clutches and valves and the like. The conveyor drive motors are typically high horsepower motors and require 480 volts and large currents. Other output devices typically require wiring for 120 volts with various current requirements. Thus, the field wiring of the output devices which must run from the control panel 10 to a large number of input and output devices distributed throughout the conveyor system requires a large number of individual conductors many of which must be of wire gage for heavy current capacity. The installation of the field wiring is complicated because of the very large number of wires, length of runs and the installation of wiring ducts; further, it is costly in terms of materials required and installation time.

BEST MODE FOR CARRYING OUT THE INVENTION

The electrical control system according to this invention will now be described. Referring to FIGS. 2 through 7 of the drawings, there is shown an illustrative embodiment of the invention for controlling a conveyor system with two or more conveyors in the system. It will be appreciated as the description proceeds that the invention may be realized in other embodiments and may be useful in other applications.

THE DISTRIBUTED ELECTRICAL CONTROL SYSTEM

Figure 2:
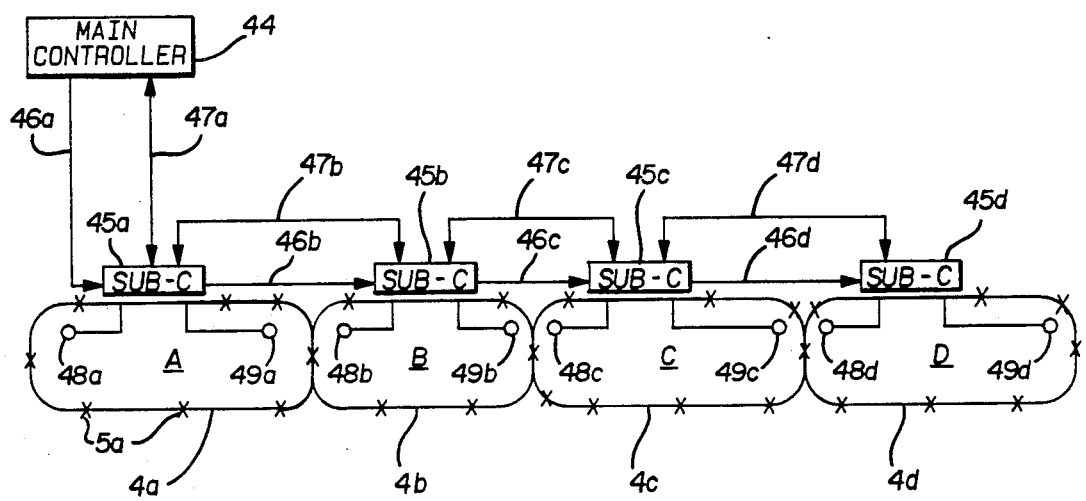
FIG. 2 is a diagrammatic representation of a conveyor system with the electrical control system of this invention.

FIG. 2 shows a general layout in a diagrammatic fashion of the conveyor system embodying the subject invention. The conveyor system comprises conveyor A which has a common track 4a with workpiece carriers 5a movable thereon; it also comprises conveyors B, C and D which have individual tracks 4b, 4c and 4d with workpiece carriers 5b, 5c and 5d thereon, respectively. The electrical control system for the conveyor system comprises a main controller 44 which is located at any selected location in the factory and also includes sub-controllers 45a, 45b, 45c and 45d which are mounted on or located immediately adjacent the conveyors sections A, B, C and D, respectively. Electrical power is supplied to the conveyor system and to each individual conveyor from the main controller through power lines 46a to sub-controller 45a and thence over power lines 46b to sub-controller 45b, thence over power lines 46c to sub-controller 45c and thence to sub-controller 45d over power lines 46d. A communications line 47a extends from a PC in the main controller 44 to the sub-controller 45a. The communications line is extended from sub-controller 45a to sub-controller 45b through line 47b and is extended from sub-controller 45b to sub-controller 45c through line 47c and is further extended from sub-controller 45c to sub-controller 45d through line 47d. Each of the conveyors is provided with a plurality of output devices, such as motors or other actuators, and with a plurality of input devices such as switches or photocells. Such output and input devices are represented in FIG. 2 by a single actuator 48a, 48b, 48c and 48d on conveyors A, B, C and D, respectively. Similarly, the input devices are represented by a single sensor 49a, 49b, 49c and 49d, on the respective conveyors A, B, C and D. The main controller and the sub-controllers will be described in detail subsequently along with the interconnections therebetween.

Figure 3:
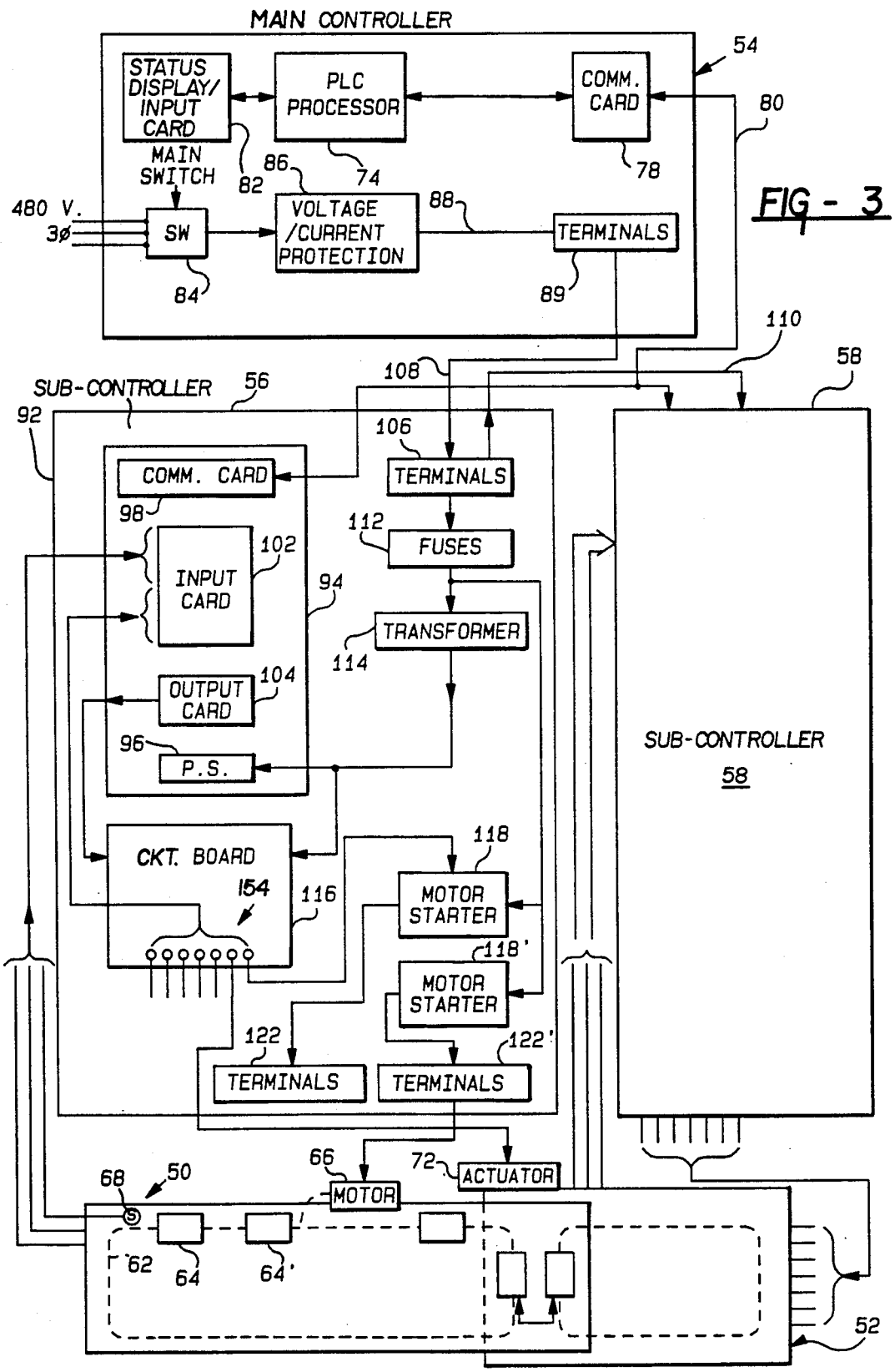
FIG. 3 is a block diagram of the electrical control system of this invention.

FIG. 3 shows the electrical control system of this invention with a conveyor system which is represented in block diagram. The conveyor system includes two individual conveyors 50 and 52 which interact with each other and must be operated in timed relationship. The conveyor system is provided with an electrical control system which comprises a main controller 54 and a sub-controller 56 for the conveyor 50 and a sub-controller 58 for controlling the conveyor 52. The main controller may be located at any suitable place in the factory with relation to the conveyors 50 and 52 whereas the sub-controller 56 is mounted on the conveyor 50 or immediately adjacent to it and the sub-controller 58 is mounted on or adjacent to the conveyor 52.

The conveyors 50 and 52, per se, are of conventional design. The conveyor 50, shown schematically, includes a conveyor track 62 which defines the conveyor path and carries a plurality of workpiece carriers 64. The carriers 64 are driven along the track by a drive motor 66 through a power train such as a drive chain. The conveyor is provided with a plurality of input devices, typically detectors or sensors, for sensing an operating condition of the conveyor, such as the presence or absence of a workpiece on a carrier. For simplicity, a single workpiece sensor 68 is shown. The sensor 68 responds to the presence of a workpiece by closing the contact of a switch in the sensor. The conveyor 50 is also provided with a plurality of actuators which are electrically controlled and energized for actuating an element of the conveyor, for example, a workpiece clamp. Only one such actuator 72 is illustrated. The conveyor 52 is of the same type as conveyor 50 and similarly includes a track and workpiece carriers with a drive motor, sensors and actuators the same as conveyor 50 but which are not illustrated.

The main controller 54 comprises a PC 74 which in the illustrative embodiment is preferably a programmable controller Model PC-2/20 available from Allen-Bradley of Cleveland, Ohio. The main controller 54 also includes a communications card 78 and the status display/input card 82. Additionally, the main controller 54 includes the power line terminals which are connected to utility supply lines for supplying electric power to the conveyor system. The terminals are connected through a main switch 84 and a circuit breaker 86, for voltage and current protection, to the power bus 88 and to terminals 89. The interconnection of the main controller 54 with the sub-controllers 56 and 58 will be described subsequently. As in FIG. 1, all of the power lines and signal conductors are represented by single lines regardless of the actual number of conductors and an arrow head indicates the direction of power flow or signal flow, as the case may be.

The sub-controller 56 comprises a chassis 92 on which is mounted a PC sub-rack 94. The sub-rack 94 contains a power supply 96, a communications card 98, the communications card 98 being connected through the communication cable 80 with the communications card 78 in the main controller, a signal input card 102 and a signal output card 104. The chassis 92 of the sub-controller is provided with a set of terminals 106 for connection, through power lines 108, with the terminals 89 in the main controller 54. The terminals 106 are connected through fuses 112 to the primary winding of a stepdown transformer 114 with a 120 volt secondary winding which supplies power to the electronic power supply 96 in the subrack 94. It also supplies power to a printed circuit board 116 which will be described subsequently.

The chassis 92 also supports two motor starters 118 and 118'. These motor starters are preferably of the integrated type which include the motor starter with integrated remote switching, an overcurrent breaker and a remote reset in one unit. The motor starters are supplied with 480 volt, 3-phase power through the fuses 112. The motor starter 118 has its output connected to field wiring terminals 122 for on-site wiring to a conveyor motor. Similarly, motor starter 118' has its output connected with field wiring terminals 122'.

The printed circuit board 116 provides all of the interconnections between the output card 104 and the output devices on the conveyor 50. The board 116 also includes the field wiring terminals 154 for connection with the respective output devices on the conveyor. The circuit board 116 also includes hardwired relay shut-off circuits in each of which a relay is connected between an output card terminal and one of the field wiring terminals 154 which, in turn, is connected to an output device on the conveyor section. The coil of the relay is hardwired to terminals on the printed circuit board and thence to an on/off switch on the conveyor section for emergency or safety cutoff of an output device.

The sub-controller 58, shown in block diagram, is of the same construction as sub-controller 56 just described and it is interconnected with the conveyor 52 in the same manner. The input devices of the conveyor 52 are connected to the input card of the sub-controller 58 and the output terminals of the printed circuit board are connected with the output devices of the conveyor 52 in the manner described with respect to sub-controller 56 and conveyor 50. The communications card of the sub-controller 58 is connected through the communications line 80 with the communications card 78 in the main controller 54. Electrical power is supplied to the sub-controller 58 through a power line 110 extending from the terminals 106 in sub-controller 56 to the power input terminals of sub-controller 58.

Figure 4:
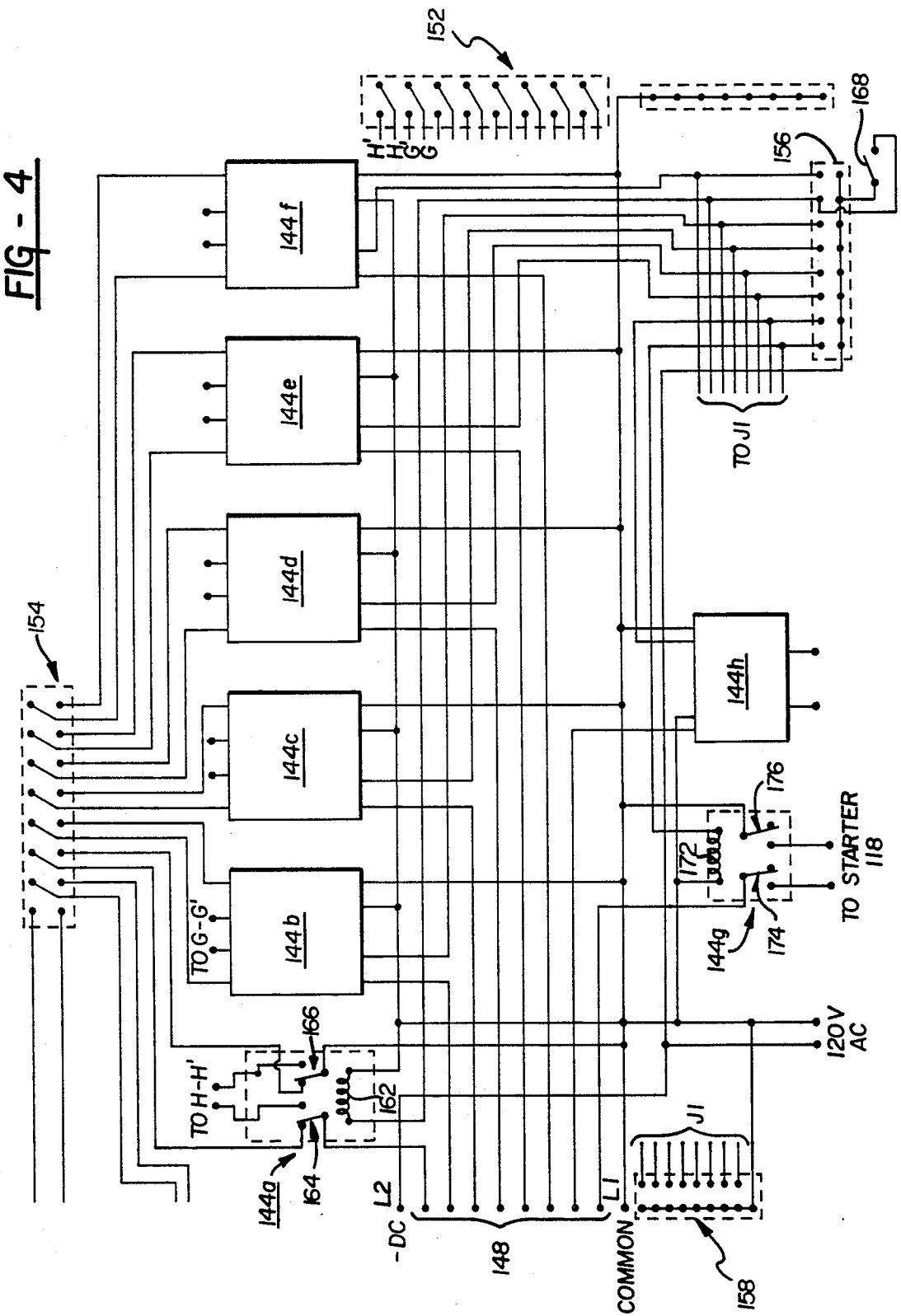
FIG. 4 is a block diagram of the control system and a diagnostic system in accordance with this invention.

The circuit contained on the printed circuit board 116 is shown in schematic diagram in FIG. 4. The circuit comprises, in general, a set of six shut-off relays 144a through f and a set of two shut-off relays 144g and h. The circuit also comprises a set of eight input terminals 148 for input device control signals, a set of eight output terminals 152 for output device control signals and a set of eight output terminals 154 are provided for the complements of the output device control signals. Additionally, the circuit comprises a set of eight input terminals 156 for connection with shut-off switches on the conveyor and a set of output terminals 158 are connected with the PC to indicate the status of the shut-off switches.

Relays 144a through 144f are all the same; only relay 144a is shown schematically. The relay comprises a relay coil 162 and a set of double pole, double throw contacts 164 and 166. The movable contact 164 is connected to one of the terminals 148 which, in turn, is connected to a respective output of the output card 104 which is switched by the PC to either line voltage (120 volts) or common voltage (0 voltage). The contact 166 is connected to the common line L1. When the relay coil 162 is energized, the voltage across the movable contacts 164 and 166 is applied to the respective output terminals H and H' of terminals 152 and thence to the respective output device. When the coil is deenergized, the voltage across the contacts 164 and 166 is applied to the respective output terminals of terminals 154 while there is no output voltage across the corresponding terminals 152. Thus, a given output device is wired to the terminals 152 or 154 depending upon whether it is to be on or off when a corresponding input terminal 148 is at 120 volts.

The relays 144g and 144h are identical to each other and only 144g is shown schematically. This relay has a relay coil 172 and a set of double pole, double throw contacts 174 and 176 which have the same connections to the respective input and output terminals as described above with reference to relay 144a. One set of fixed contacts of the relay are connected to the control input of the motor starter 118. The relay 144h may be used for the motor starter 118' or other purposes, as needed.

As shown in FIG. 4, the AC power line supplies 120 volts AC to the coils of the respective relays 144a through 144h. (Alternatively, DC voltage may be supplied, depending upon requirements.) The power line is connected across the common line L1 and the 120 volt line L2. One terminal of the relay coil 162 is connected with the common line L1 and the other terminal is connected to one of the relay input terminals 156. An interrupt or shut-off switch 168 is connected across the respective one of the input terminals 156 and L2. When it is closed, the relay coil 162 is energized. When the shut-off switch 168 is open, the relay is deenergized and the output device controlled by the relay is shut-off. The respective input terminal of terminals 156 is connected with one of the output terminals 158 which, in turn, is connected with an input on the input card 102 to indicate relay status in the PC. Each of the other relays 144b through 148f is connected in the same way to the respective input and output terminals of the circuit which is contained in the printed circuit board 116. In case one or more of the output devices is not to be connected with a shut-off switch, the respective relay may be omitted from the circuit and the respective input terminal 148 is hard wired to the corresponding output terminal 152 or 154, as desired, by a shunt connection on the printed circuit board.

THE DIAGNOSTIC SYSTEM

Figure 5:
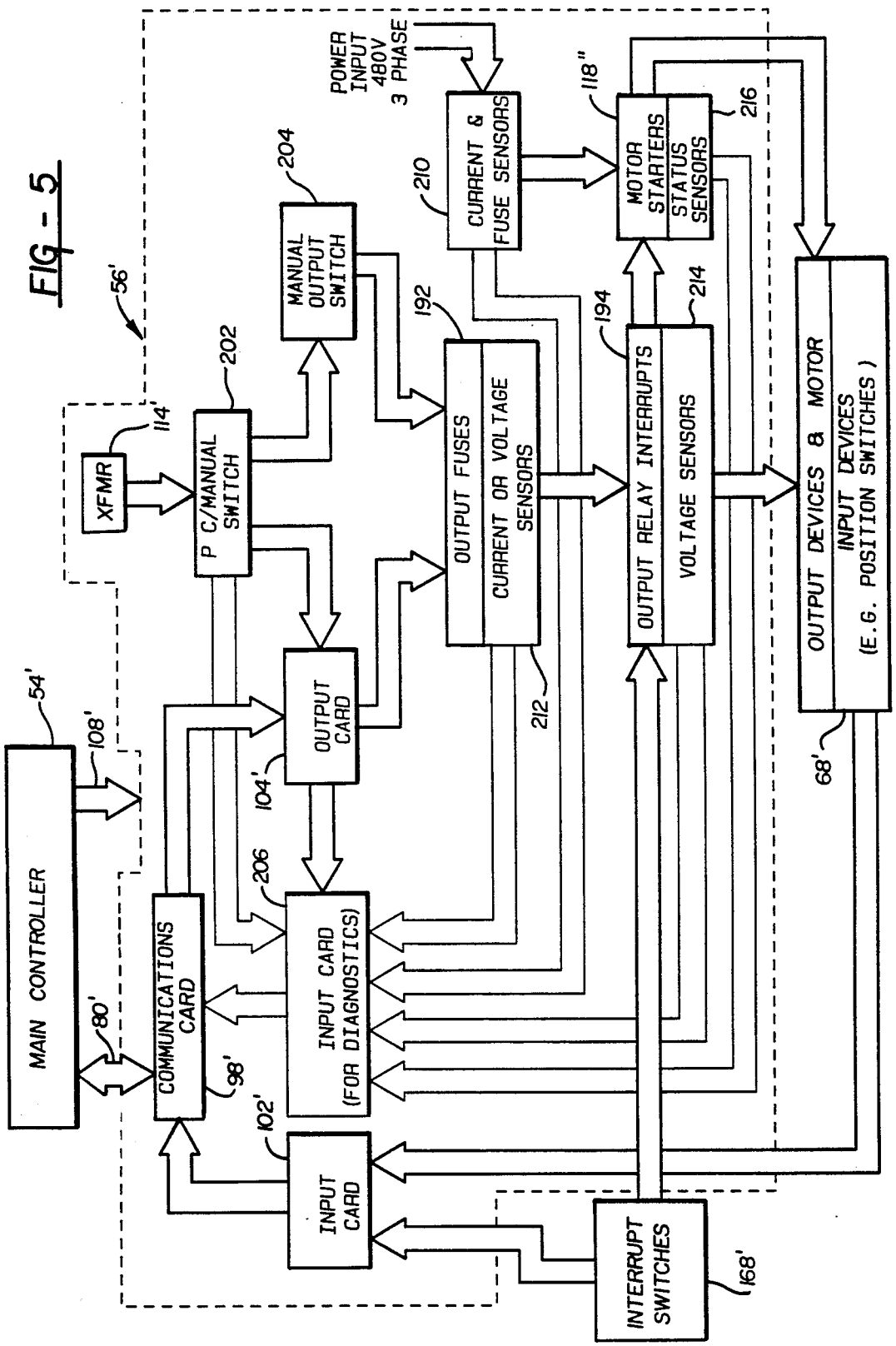
FIG. 5 is a schematic diagram of the circuitry of the printed circuit board.

The use of a sub-controller for each conveyor of a conveyor system makes it practical to utilize an electronic diagnostic system for the conveyor control system. The diagnostic system in combination with a sub-controller is depicted in block diagram form in FIG. 5. The electrical control system for the conveyor as represented in FIG. 5 is the same as that described with reference to FIG. 3 and the detailed description of the main controller and sub-controller circuits will not be repeated. The PC 74 in the main controller is provided with a diagnostics program stored in memory. The main controller 54' is interconnected with the sub-controller 56' by a communications line 80' and by a power bus 108'. The main controller 54' and its sub-controller 56' differ from the main controller 54 and sub-controller 56 of FIG. 3 only in respect to the addition of diagnostic circuits which will be described presently.

In the sub-controller 56', the communications card 98' and the input and output cards 102' and 104' correspond with those described with reference to FIG. 3. The sub-controller, as depicted in FIG. 5 includes a set of output fuses 192 which are not illustrated in FIG. 3; each of these fuses is connected in series with a respective output from the output card 104'. Also, the diagram of FIG. 5 depicts shut-off relays 194 which are not explicitly shown in FIG. 3 but are described as being mounted on the printed Circuit board 116. In the circuit of FIG. 5, the 120 volt power input from the transformer 114' is applied through the manually actuated switch 202 for selecting either PC control or manual control of the sub-controller. When the switch 202 is in the PC position, the controller is placed in the run condition for conveyor operation; when it is placed in the manual position, the output card 104' can be manually stepped through each successive output condition for diagnostic purposes. When the switch 202 is in the PC position, the 120 volt power input is applied through the switch to the output card 104'. When the switch 202 is in the manual position, the 120 volt power input is applied to the manual output switch 204 and a manual mode signal is sent to the diagnostic input card 206 to inhibit control of the output card by the PC. In the manual mode, the output switch 204 selectively applies the 120 volt power to each of the output devices through the fuses 192 and shut-off relays 194 for diagnostic purposes.

The diagnostic system comprises the diagnostic input card 206 which is connected with the communications card 98' dedicated to the diagnostic system. The diagnostic input card 206 receives multiple inputs from sensors located in the sub-controller 56' which are transmitted by the communications card 98' through the communications line 80' to the main controller 54' in which the signals are processed by the PC operating under control of the diagnostic program.

The diagnostic circuits of the sub-controller 56' includes multiple sensors each of which is adapted to detect the presence or absence of a voltage or current at a selected point in the control circuit. Each of the sensors provides a two state output which is applied to the diagnostic input card 206. Sensors 210 are coupled with the 480 volt, 3 phase power input terminals and sense motor current and fuse condition. Sensors 212 are coupled with each of the output fuses in the output circuits of the output card 104' and produce diagnostic signals indicative of the open or closed condition of the respective circuit. Sensors 214 are coupled respectively with the input lines of the coil relays and each produces a diagnostic signal indicative of the status of the respective relay. Sensors 216 are coupled with the motor starters 118" and provide diagnostic signals for each starter indicative of on/off status.

The diagnostic circuits, as described above, are preferably provided by a printed circuit board in the sub-controller 56', either on a separate diagnostic board or on the board 116 previously described. All of the circuit points needed for the diagnostic system are made accessible at the sub-controller chassis to avoid the need for field wiring to provide the diagnostic system. The only wiring outside of the sub-controller is the communication line between the sub-controller 56' and the main controller 54'.

THE SUB-CONTROLLER MODULE

Figure 6:
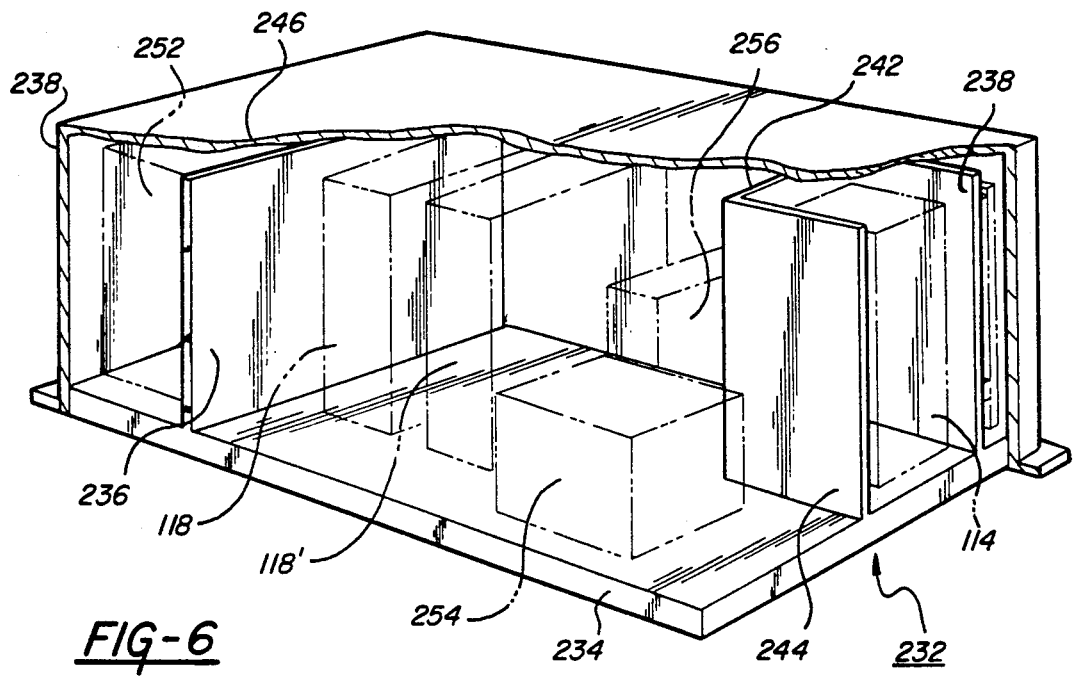
FIG. 6 is a perspective view of a sub-controller chassis of this invention.
Figure 7:
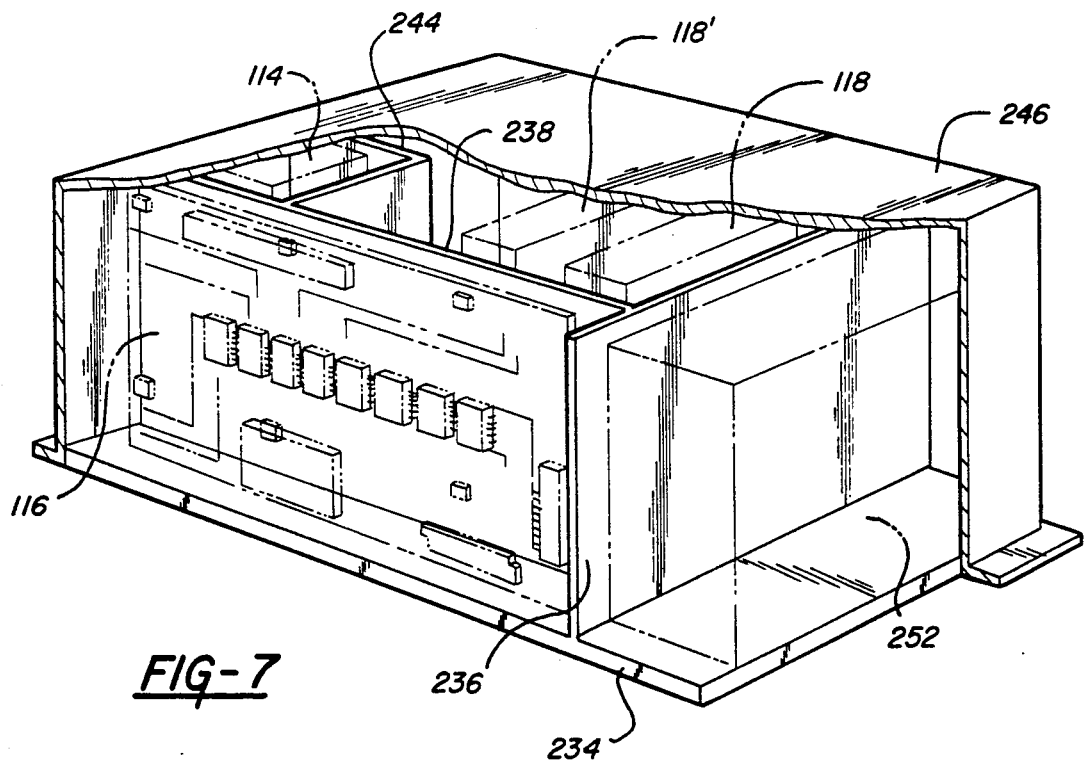
FIG. 7 is another perspective view of the sub-controller chassis.

The sub-controller chassis and the major components mounted on the chassis are shown in FIGS. 6 and 7. In these Figures, the major components which are mounted on the chassis are shown in interrupted line and will be identified subsequently. The chassis 232 comprises a unitary molded body which is provided with a base panel 234, a side panel 236 and a back panel 238. The front and one side of the chassis are open. However, an interior compartment is provided by interior walls 242 and 244. The molded chassis 232 provides a mounting base for the electrical components of the modular sub-controller. It is provided with a metal cover 246 constructed of sheet metal, suitably aluminum. The cover 246 is rectangular and is closed on the top and four sides and terminates at its lower edge in a flange adapted for seating against a mounting plate or shelf (not shown) for the chassis. The molded chassis 232 is constructed of a material with a high dielectric constant, suitably a phenolic plastic which, in combination with the cover 246, provides electrical isolation of the high voltage components and power circuits from the logic and shut-off device circuitry. Additionally, the chassis 232 may be provided with wire fixation devices and strain relief devices to facilitate the electrical connections. The electrical components mounted on the chassis 232 and contained within the cover 246 are illustrated in phantom line lay out in FIGS. 6 and 7. An electrical mounting and connector rack 252 is supported by the chassis outside the end wall 236 and within the cover 246. This rack 252 supports the input card 102, output card 104, communications card 98, power supply 96 and diagnostic input card 206. The printed circuit board 116 is mounted on the chassis 232 outside the back wall 238 and within the cover 246. As previously noted, the diagnostic circuits of the sub-controller are preferably provided on a printed circuit board which may be a part of board 116 or may be an additional board mounted in a similar manner. The motor starters 118 and 118' are mounted side-by-side on the base of the chassis 232. The power terminal block 254 is mounted on the base 234 and provides two 3-pole input terminals and two 3-pole output terminals for 480 volt connection between the power input conductor and the motor starters 118 and 118'. A 3-pole fuse block 256 is mounted adjacent the terminal block 254 for connection of fuses in the 480 volt, 3 phase lines. The interior walls 242 and 244 taken with a part of the back wall 238 form a compartment in which the power transformer 114 is mounted. As previously described, transformer 114 has its input winding connected with the 480 volt, 3 phase supply lines and its secondary winding develops a 120 volt, single phase for power to the electronic power supply 96 and the printed circuit board 116.

It will be understood that the sub-controller module, as just described, may be adapted for different conveyor systems by utilizing different components or numbers of components in a standard module. In the illustrative example, the printed circuit board is adapted to support eight cut-off relays; however, as noted above a relay may be omitted if an output circuit does not require a safety cut-off. The sub-controller module in the illustrative embodiment is provided with two motor starters even though the conveyor only utilizes one active drive motor. The second starter is provided as a back-up in case of failure of the first to avoid down-time of the conveyor. The numbers and types of components in the illustrative embodiment of the sub-controller module is consistent with the typical requirements for conveyor systems in the automotive industry. It will be appreciated that the sub-controller module may be designed as needed to meet the requirements of the particular conveyor application.

EXAMPLE COMPONENTS

The illustrative embodiment of the invention, as described above, suitably comprises the following components available from Allen-Bradley of Cleveland, Ohio.

| Reference Character & Name | Allen-Bradley Part |
| --- | --- |
| 74 - programmable controller | Model PC-2/20 |
| 78 - communication card | 1778-ASB |
| 82 - status display/input card | |
| 94 - pc sub-rack | 1771-A/B |
| 96 - power supply | 1771-P7 |
| 98/98' - communications cards | 1771-ASB |
| 102 - signal input card | 1771-IAD |
| 104 - signal output card | 1771-OAD |
| 118/118' - motor starters | Series 190 Integral Starter |
| 144a-h - shut off relays | HF32A1 |
| 206 - diagnostic input card | 1771-IBN |

CONCLUSION

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. For use with a conveyor system which comprises a plurality of individual conveyors each of which has a member which must be moved in timed relation with the movement of a movable member of at least one other of said plurality of conveyors, a main control panel including a main switch for connection with electric power lines to supply power to the conveyor system, a programmable controller having plural output terminals and plural input terminals and a communications card having input terminals coupled with each of the output terminals of the programmable controller, a sub-control panel for each of said conveyors, each sub-control panel including a motor starter, a signal output card having plural output terminals, a signal input card having plural input terminals, a communications card and power input terminals, each of said conveyors including a track defining a conveyor path, a workpiece carrier movable on said track, an electric motor for driving said carrier along said track, at least one electrically controlled output device disposed adjacent said track, at least one sensor disposed adjacent said track for sensing an operating condition of said conveyor, a conductive wire connected between said output device and one of the output terminals on said output card, a conductive wire connected between said sensor and one of the input terminals on said input card, power lines connected between said main switch in said main control panel and said power input terminals in each of said sub-control panels, a communications cable connected between the communications card in the main control panel and the communications card in each of the sub-control panels, said programmable controller including a program memory with an application program stored therein and being operable under program control by said application program to produce output signals on the output terminals of the programmable controller in response to input signals on the input terminals of the programmable controller, each of said communications cards at the sub-control panels transmitting data over said cable in accordance with the output signals on its respective input card and receiving data over said cable in accordance with the output signals addressed to it by the communications card at the main control panel.

2. The invention as defined in claim 1 wherein, said main control panel and each of said sub-control panels includes a step-down transformer having its primary winding connected across said power lines, an electronic power supply circuit having input terminals connected with the secondary winding of said transformer for producing a regulated DC supply voltage for said communication card.

3. The invention as defined in claim 1 wherein: each of said sub-control panels includes relay means, and said relay means comprises a motor starter relay having power input terminals connected with said power lines, power output terminals connected with field wiring terminals on said sub-control panel and having control input terminals connected with said output card.

4. The invention defined in claim 3 wherein one of said sensors is a manually actuated emergency shut-off switch on said conveyor, and said relay means comprises an interrupt relay having input terminals connected by conductive wires with a controlled switch and having output terminals connected with said motor starter relay.

5. The invention as defined in claim 1 wherein each of said sub-control panels comprises:

an input field wiring terminal strip including plural electrical terminals for connection, respectively, to a plurality of sensors and being connected, respectively, with said plurality of input terminals on the input card, and an output field wiring terminal strip including a plurality of electrical terminals for connection, respectively, with said output device on said conveyor and connected, respectively, with the output terminals on said output card.

6. The invention as defined in claim 1 wherein said main control panel includes over current and over-voltage protection means connected between said input terminals and said power lines.

7. The invention as defined in claim 2 wherein each of said sub-control panels includes over-current protection means connected between said power input terminals and said transformer primary winding.

8. The invention as defined in claim 3 including:

a diagnostics program stored in said program memory, a diagnostics input card in each sub-control panel and coupled through said communications card in the sub-control panel to the communications card in the main control panel, and plural diagnostic sensors coupled with said relay means.

9. The invention as defined in claim 8 wherein:

said relay means comprises an interrupt relay coupled with an output device, and one of said diagnostic sensors is coupled with said interrupt relay.

10. The invention as defined in claim 8 wherein:

all of said diagnostic sensors are located in said sub-control panel.

* * * * *